United States Patent [19]
Robinson et al.

[11] Patent Number: 5,303,352
[45] Date of Patent: Apr. 12, 1994

[54] DUAL CONNECTOR PORT FOR BUS MASTER CARD

[75] Inventors: Thomas N. Robinson, Lincoln Township, Berrien County; Mark D. Nicol, Stevensville; Anthony M. Olson, Stevensville; Todd R. Witkowski, Stevensville, all of Mich.

[73] Assignee: Zenith Data Systems Corporation, Buffalo Grove, Ill.

[21] Appl. No.: 433,057

[22] Filed: Nov. 6, 1989

[51] Int. Cl.⁵ .............................................. G06F 13/00
[52] U.S. Cl. .............................. 395/325; 364/DIG. 2; 364/927.93; 364/929.4; 364/926.91
[58] Field of Search .................. 364/DIG. 1, DIG. 2; 395/325, 275, 500, 725

[56] References Cited

U.S. PATENT DOCUMENTS

| | | | |
|---|---|---|---|
| 3,881,174 | 4/1975 | Barnich | 340/172.5 |
| 4,816,990 | 3/1989 | Williams | 364/200 |
| 4,918,589 | 4/1990 | Floro et al. | 364/900 X |
| 4,942,550 | 7/1990 | Murray | 364/900 |
| 4,949,338 | 8/1990 | Albal et al. | 370/85.6 |

*Primary Examiner*—Thomas M. Heckler
*Attorney, Agent, or Firm*—Flynn, Thiel, Boutell, and Tanis

[57] ABSTRACT

A computer system includes a control circuit having a request input, and a pair of connectors which are electrically coupled to the control circuit and are each connected to the request input of the control circuit, each connector being capable of removably receiving a circuit card. The control circuit includes a checking arrangement for detecting a condition in which the connectors each have therein a card having a request output controlling the request input of the control circuit.

13 Claims, 3 Drawing Sheets

DUAL CONNECTOR PORT FOR BUS MASTER CARD

FIELD OF THE INVENTION

This invention relates to a computer system having a plurality of connectors which are coupled to a bus and can each removably receive a circuit card and, more particularly, to such a system in which a circuit card capable of taking control of the bus can be inserted into any connector.

BACKGROUND OF THE INVENTION

In conventional computer systems of the type commonly referred to as "personal" computers, there are typically a plurality of connectors or "slots" which are each coupled to a system bus of the computer system and which can each removably receive a printed circuit card. The circuit cards are optional and not necessary for normal system operation, and either augment functions which are inherent in the system or provide functions which are not inherent in the system. Usually these circuit cards are slaves to a controller circuit which controls the system bus and is an integral part of the computer system, and do not themselves attempt to control the system bus. On the other hand, a few conventional circuit cards do have the capability to operate in a mode in which they actually take control of the bus, because it permits them to operate more efficiently. A card of this type is sometimes called a "bus master" card.

Obviously, the controller circuit and a bus master card cannot both control the system bus simultaneously, and there must therefore be some type of handshaking arrangement which allows them to coordinate who will be controlling the bus at any given point in time. One conventional approach is to provide a special request line and a special acknowledge line for each bus master card. The bus master card produces a request signal to the controller circuit on the request line when it wishes to take control of the bus, and then the controller circuit produces an acknowledge signal back to that card at the point in time when the controller circuit actually yields control of the bus to the bus master. In the interest of compactness, power efficiency and minimum cost, an integrated circuit has been developed for incorporation into a controller circuit in order to carry out the function of handling the request and acknowledge signals for several bus master cards and to carry out the function of prioritizing the request signals when two or more bus master cards simultaneously request control of the bus. This integrated circuit is an Intel Model 82357, which is commonly called an integrated system peripheral (ISP) and which is commercially available from Intel Corporation of Santa Clara, California. The ISP has six request inputs and six corresponding acknowledge outputs. It is designed for use with six connectors which can each removably receive a bus master card, each connector being connected to a respective one of the request inputs and to the corresponding acknowledge output. The ISP is entirely satisfactory for computer systems which have no more than six connectors. However, it is very common for a computer system of the type in question to have seven or more connectors.

One design approach to a system having seven or more connectors is to use two or more ISP components. However, each ISP component is relatively expensive, and this approach is thus not satisfactory because it increases the overall cost of the computer system. An alternative approach is to select six of the seven or more slots, to connect each of the selected six slots to a respective request input and acknowledge output of the ISP, and to require persons using the system to ensure that each bus master card which is added to the system is inserted in one of the selected six connectors, the remaining connectors being used only for cards which are not bus master cards. A problem with this approach is that many users are not technically sophisticated, and may not be aware that a particular card is or is not a bus master card, or which of several identical connectors can receive a bus master card and which cannot. In short, for user convenience and customer satisfaction, it is desirable that each connector in a system have the capability to accept a bus master card under at least some circumstances.

Accordingly, an object of the present invention is to provide a system which has a single ISP and has several connectors each coupled to the single ISP in a manner so that each connector is capable under certain conditions of operatively receiving a bus master card, the number of connectors being greater than the number of request inputs of the ISP.

It is a further object of the invention to provide such a system in which an automatic check is carried out when the system is turned on, in order to verify that the number and arrangement of bus master cards in the connectors is acceptable, and in order to terminate operation and notify the user in the event of any detected problem.

A still further object of the invention is to provide such a system in which a minimum amount of additional hardware and software is required in order to give each connector the capability to receive a bus master card in at least some circumstances and to automatically check the arrangement of bus master cards for any problem.

The objects and purposes of the invention, including those set forth above, are met by providing a method and apparatus in which a pair of connectors are each connected to a request input of a control circuit and can each removably receive a circuit card, a check being carried out for a condition in which the connectors each have therein a circuit card having a request output to control the request input of the control circuit.

BRIEF DESCRIPTION OF THE DRAWINGS

Two preferred embodiments of the invention are described below in detail with reference to the accompanying drawings, in which.

DETAILED DESCRIPTION

Figure 1:
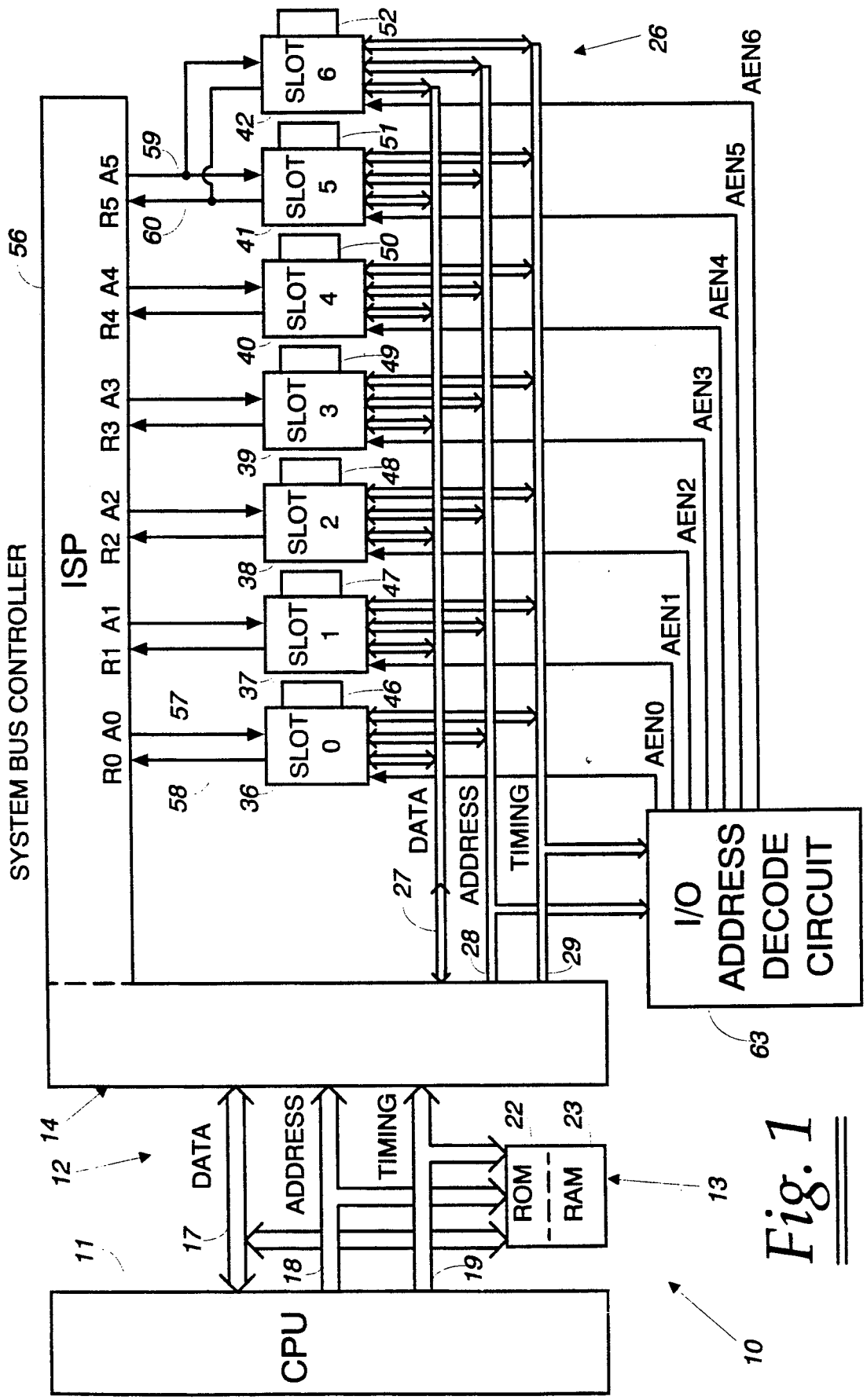
FIG. 1 is a block diagram of a computer system embodying the present invention.

FIG. 1 shows a computer system 10 which embodies the present invention. The computer system 10 includes a central processing unit (CPU) 11 connected by a local bus 12 to a memory 13 and to a bus controller circuit 14. In the preferred embodiment, the CPU 11 is an Intel Model 80386, which is a conventional microprocessor commercially available from Intel Corporation of Santa Clara, Calif. However, the CPU could be almost any other commercially available microprocessor. The local bus 12 includes data lines 17 and control lines 18 and 19, the control lines 18 carrying address information and the control lines 19 carrying timing information. Since the CPU 11 controls the local bus 12 and since the CPU 11 is itself conventional, the structure and operation of the local bus 12 is also conventional, and is therefore not described in detail here. The memory 13 includes a section of conventional read only memory (ROM) 22 and a section of conventional random access memory (RAM) 23. The ROM 22 stores a configuration program, a portion of which will be discussed in detail later.

The system bus controller circuit 14 controls a system bus 26 which includes data lines 27 and control lines 28 and 29, the control lines 28 carrying address information and the control lines 29 carrying timing information. The system bus 26 conforms to an industry standard commonly referred to as EISA (Extended Industry Standard Architecture), which is an enhanced version of an earlier industry standard commonly referred to as ISA (Industry Standard Architecture). The operation of the system bus 26 conforms to the EISA specification, which is available in written form, for example from BCPR Services, Inc. of Washington, D.C. The system bus controller circuit 14 also conforms to the EISA standard and is otherwise similar to conventional bus controllers used in commercially available computers, and is therefore not described here in detail. The bus controller circuit 14 is ultimately controlled by the CPU 11 and memory 13, and thus the CPU 11, memory 13 and circuit 14 can together be viewed as a control circuit for the system bus 26.

Seven connectors 36–42 are provided and are each connected to the lines of the system bus 26. The connectors 36–42 are often referred to in the art as "slots". The connectors 36–42 are each conventional and commercially available parts which also conform to a portion of the EISA specification relating to connectors.

Seven printed circuit cards 46–52 are each removably plugged into a respective one of the printed circuit connectors 36–42. The circuit cards 46–52 are optional, and do not need to be present in order for the system 10 to operate. One or more of the cards 46–52 may optionally be added to enhance system operation by providing features not inherently present or by augmenting features which are present. For example, if the amount of RAM at 23 is not sufficient for a particular application, a conventional and commercially available circuit card may be added which includes additional RAM. Similarly, if a given application requires the computer system 10 to communicate with another computer system through telephone lines, it is possible to plug into one of the connectors 36–42 a conventional and commercially available circuit card which has modem circuitry capable of effecting communications across a telephone line.

The connectors 36–42 will accept conventional circuit cards which conform to the earlier ISA specification, as well as conventional circuit cards which conform to the EISA specification. For purposes of the present invention, the EISA category of cards can be broken into two subcategories, one of which is commonly referred to as EISA "bus master" cards, and the other of which is EISA cards other than bus master cards. An EISA bus master card is one which has the capability to take control of the control lines 28 and 29 of the system bus 26, in particular by generating the address and timing signals necessary to control transfers across the bus 26. The system bus controller 14 yields control of the lines 28 and 29 when a bus master card is operating in this mode, in a manner which is described later.

According to the earlier ISA standard, an ISA circuit card, during an input/output (I/O) cycle, can respond to an I/O address on address lines 28 only if the least significant bits (LSBs) of the address are within the range of 100–3FF (hexadecimal). In contrast, under the EISA specification, EISA cards can respond to an I/O address only if the LSBs of the address are within one of the ranges 000–0FF, 400–4FF, 800–8FF, and C00–C44 (hexadecimal). Persons familiar with this art will readily recognize that the ISA and EISA address ranges are mutually exclusive. Under the EISA standard, each EISA card must also include an identification (ID) register, containing a constant value which identifies the particular type of EISA card in qaestion, including characteristics such as whether or not it is a bus master card. In response to I/O address C80, the EISA card must place the constant from its ID register on the data lines 27 of system bus 26.

The system 10 includes an I/O address decode circuit 63, which monitors the control lines 28 and 29 of the EISA system bus 26 and has seven outputs AEN0–AEN6 which are active low and are thus normally maintained at a logic high voltage, and which are each connected to a terminal on a respective one of the connectors 36–42. The decode circuit 63 monitors the LSBs of the address lines 28 during a time interval when the timing lines 29 indicate that an I/O cycle is in progress. If the circuit 63 finds that the least significant bits are within the range 100–3FF for ISA cards, it drives all of its outputs AEN0–AEN6 to a logic low voltage, regardless of the state of the most significant bits (MSBs) of the address lines 28. On the other hand, if the LSBs of the address lines fall within one of the four ranges for an EISA card, the circuit 63 decodes the MSBs of the address lines 28 and drives one of its outputs AEN0–AEN6 selected by the MSBs to a logic low voltage while maintaining the rest of its outputs at a logic high voltage.

Thus, when an ISA card is addressed during an I/O cycle, the outputs AEN0–AEN6 are all driven low so as to send an enable to every one of the connectors 36–42 and thus every ISA card in the system is enabled. (Of course, EISA cards which are present will also receive the enables, but will not respond because the LSBs of the I/O address are not within any of the defined ranges for EISA cards). On the other hand, when an EISA card is addressed during an I/O cycle, only one of the outputs AEN0–AEN6 of the circuit 63 is driven low and thus only one of the connectors 36–42 receives an enable. In the preferred embodiment, the output AEN0 is driven low when an I/O address is in one of the ranges 1000–10FF, 1400–14FF, 1800–18FF or 1C00–1CFF, the output AEN is driven low for an I/O address in one of the ranges 2000–20FF, 2400–24FF, 2800–28FF and 2C00–2CFF, and so forth. Those of ordinary skill in the art are thoroughly familiar with address decode circuits, and will immediately understand the specific logic circuitry required for the circuit 63, and therefore the circuit 63 is not disclosed here in further detail.

In order to provide handshaking between an EISA bus master card and the system bus controller 14, the system bus controller circuit 14 includes an integrated system peripheral (ISP) 56, which in the preferred embodiment is an Intel Model 82357 commercially available from Intel Corporation of Santa Clara, Calif. The ISP 56 is entirely conventional, and therefore is not described in detail here. It has six request inputs R0-R5, and six acknowledge outputs A0-A5. Acknowledge outputs A0-A4 are each connected to a terminal on a respective one of the connectors 36-40, and request inputs R0-R4 are also each connected to a terminal on a respective one of the connectors 36-40. The acknowledge output A5 is connected to a terminal on the connector 41 and also to the equivalent terminal on connector 42, and two corresponding terminals on the connectors 41 and 42 are each connected to the request input R5. In essence, a single "port" of ISP 56 corresponding to terminals R5 and A5 is operatively coupled to each of the pair of connectors 41 and 42.

When an EISA bus master card is in connector 36 and wants to temporarily take control of the bus 26, it issues a request signal on line 58 to the ISP 56 of controller circuit 14, and when the controller circuit 14 thereafter reaches a point where it can yield control, it sends an acknowledge signal on line 57 and stops controlling the control lines 28 and 29 of system bus 26, and the bus master card in connector 36 responds to the acknowledge signal by commencing generation of control signals on the control lines 28 and 29 of bus 26. A bus master card present in one of the connectors 37 to 42 requests control of the bus in a similar manner, provided with regard to connectors 41 and 42 that only one of them contains a bus master card.

In particular, it is permissible for connectors 41 and 42 to each have a circuit card therein, provided the two circuit cards are not both EISA bus master cards. If both cards were bus master cards, both might request control of the bus using line 60 at about the same point in time, and when the bus controller circuit 14 thereafter produced an acknowledge signal on line 59, the two bus master cards in slots 41 and 42 would attempt to simultaneously control the bus, thereby generating errors. Circuit cards are normally inserted into and removed from the connectors 36-42 while system power is turned off. Therefore, each time system power is turned on, the system must check to see which cards are actually present at that point in time. In particular, following power-up, the system 10 must be certain that connectors 41 and 42 do not both have bus master cards therein.

Figure 2:
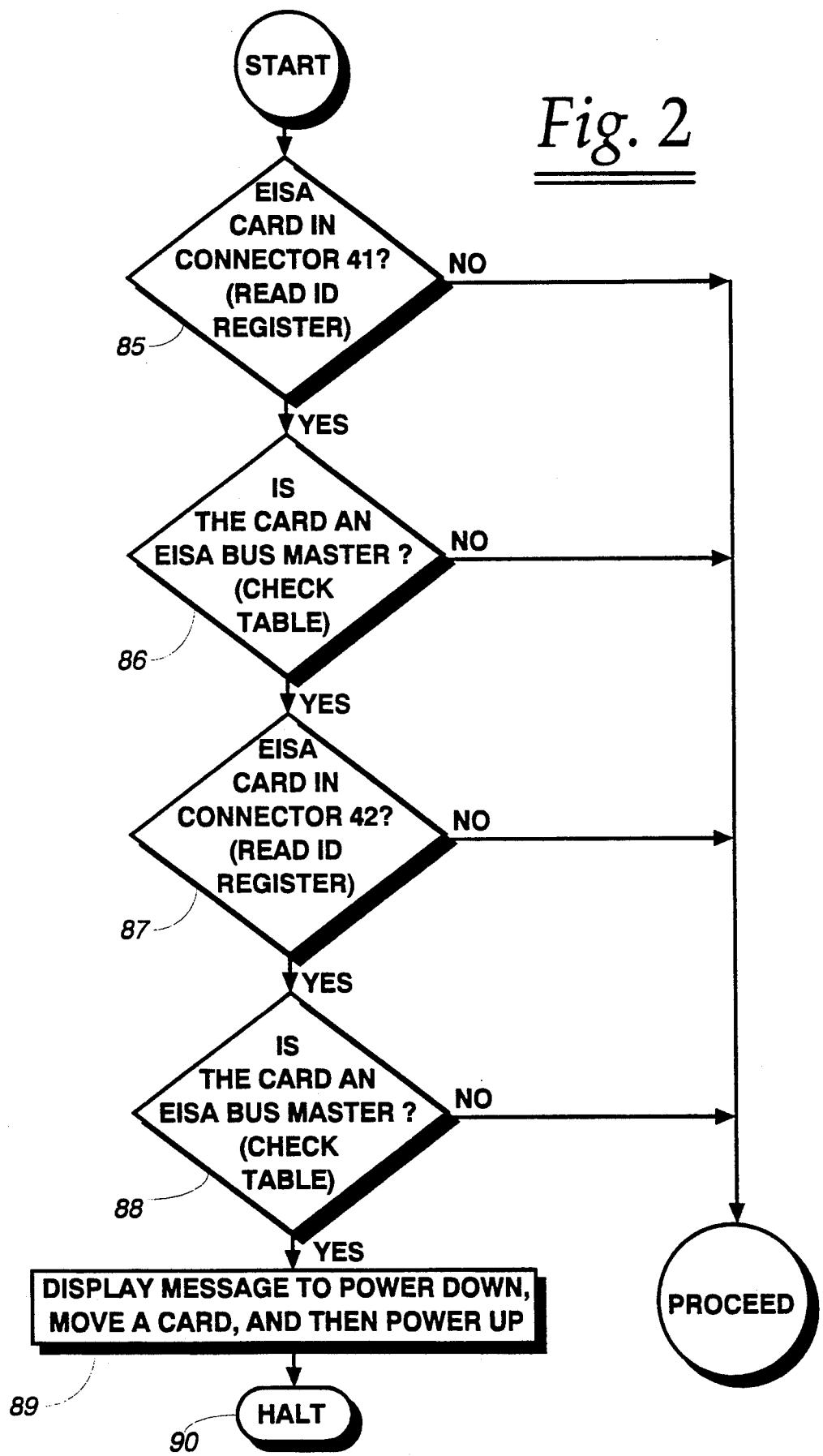
FIG. 2 is a flow chart showing a program segment which is carried out by the system of FIG. 1.

Therefore, following system power-up, the CPU 11 executes a program segment which is part of a configuration program stored in the ROM 22. Alternatively, the configuration program could be provided on a floppy disk removably inserted in a conventional and not-illustrated disk drive of the system, or could be resident on a conventional and not-illustrated hard disk drive of the system. Pursuant to this program segment, the CPU 11 assumes that an EISA card may possibly be present in each of the connectors 41 and 42, and attempts in succession to read the ID register (I/O address C80) for each such card. In particular, the CPU 11 causes the bus controller 14 to read I/O address 6C80, which causes decode circuit 63 to activate output AEN5 to enable connector 41. If no card is present in the connector 36, there will be no response and thus no valid ID number will be sent to the CPU 11. Similarly, if a card is present but it is an ISA card, it will not respond because the LSBs of the I/O address are in a range for an EISA card rather than an ISA card, and thus the CPU will again not receive a response and in particular will not receive a valid ID number. In either case, the CPU 11 will recognize, based on the fact that it did not receive a valid ID number, that connector 41 does not contain an EISA card, and in particular does not contain an EISA card of the bus master subcategory. Next, the CPU 11 will use I/O address 7C80 to check connector 42. It is important to note that, although connectors 41 and 42 are both connected to input R5 and output A5 of the ISP circuit 56, the decode circuit 63 produces respective enables AEN5 and AEN6 for them, and thus the CPU 11 is capable of separately and independently polling each of the connectors 41 and 42 in order to determine whether or not a circuit board is present and to determine the particular type of card. As to either connector, if the CPU 11 obtains a valid ID number, the CPU 11 knows that an EISA card is present in the connector, and the CPU must then determine whether that EISA card is a bus master card. To make this determination, the CPU looks the ID number up in a table, which might for example be stored in the ROM 22 or might alternatively be stored on a conventional floppy disk inserted in a conventional and not-illustrated disk drive. The information obtained from the table on the basis of the ID number will identify the specific type of EISA card, and in particular will identify whether the card is a bus master card. If the CPU 11 determines that slots 41 and 42 each contain an EISA bus master card, the CPU 11 displays a message on a conventional CRT display or conventional printer, which instructs the operator to turn off power, move a card from one of the connectors 41 or 42 to one of the connectors 36-40, and to then turn power back on. Then, the CPU halts to wait for the operator to comply. After the operator carries out the requested sequence of steps and turns system power back on, the CPU 11 will perform the same program segment just described to again check connectors 41 and 42, but this time should find that only one of the connectors 41 and 42 contains an EISA bus master card and thus the CPU 11 will proceed with normal operation. FIG. 2 is a flowchart depicting in blocks 85-91 the basic control sequence described above.

The program segment shown in the flowchart of FIG. 2 may be viewed as a first operational mode of the system and, when the system proceeds at 91 in FIG. 2 to a normal operating program, the normal operating program may be viewed as a second operating mode of the system.

Figure 3:
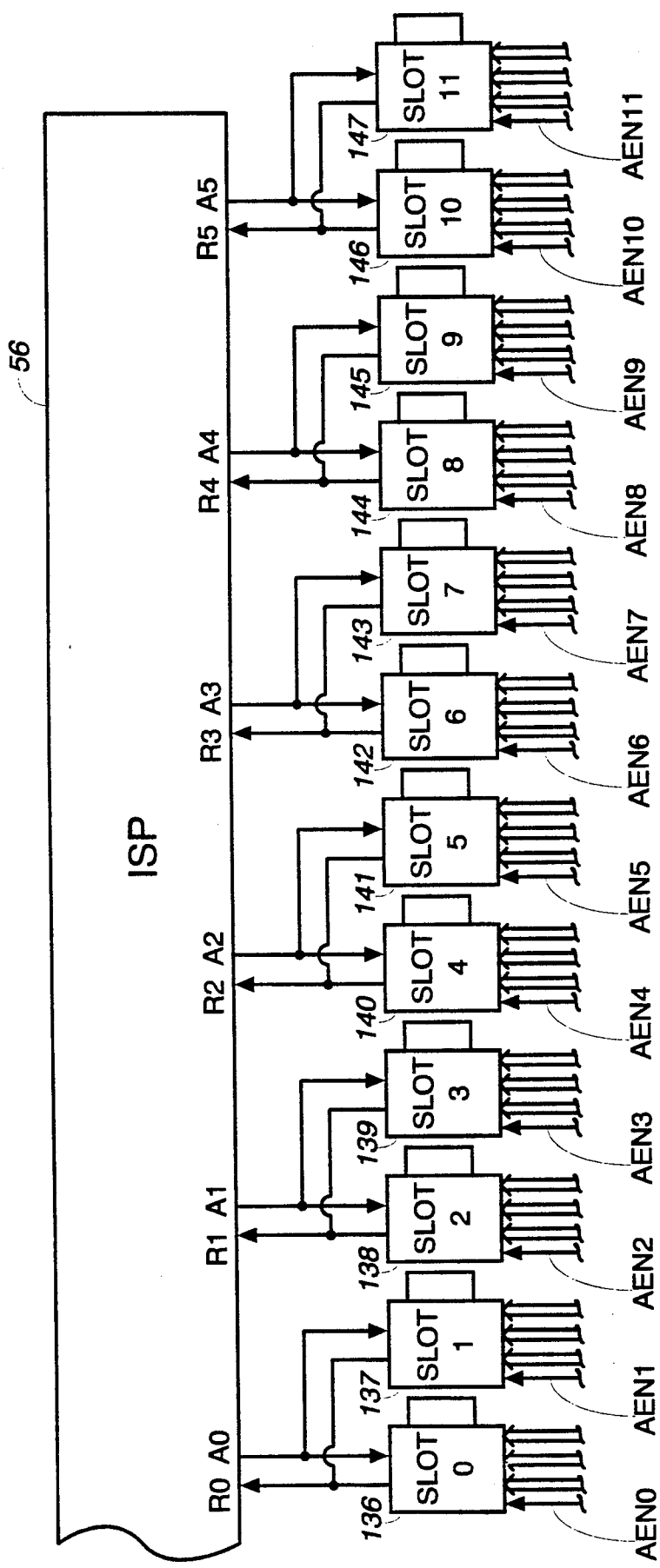
FIG. 3 is a block diagram of a portion of a system which is an alternative embodiment of the system shown in FIG. 1.

FIG. 3 shows a variation of the embodiment of FIG. 1, which is identical to the embodiment of FIG. 1 except that it includes twelve connectors 136-147. Each of the six acknowledge outputs A0-A5 of the ISP 56 is connected to a respective pair of the connectors 136-147, and the connectors of each such pair have respective terminals which are both connected to a respective one of the request inputs R0-R5. Each of the connectors 136-147 also receives a respective one of twelve enable lines AEN0-AEN11 from a not-illustrated decode circuit similar to the circuit 63 in FIG. 1. In the embodiment of FIG. 3, the CPU checks each pair of connectors to be certain that the connectors of each pair do not both contain EISA bus master cards. In other words, a program segment similar to that shown in FIG. 2 is carried out for each of the six pairs of connectors in FIG. 3. Thus, the system of FIG. 3 can accept twelve circuit cards, up to six of which can be EISA bus master cards, and an EISA bus master card can be inserted into any of the twelve connectors so long as the connector paired with it does not also contain a bus master card, and in any event if two bus master cards are simultaneously present in the connectors of a given pair, the system will detect the condition before errors can occur and require appropriate correction.

Although two preferred embodiments of the invention have been disclosed in detail for illustrative purposes, it will be recognized that variations or modifications of the disclosed embodiments, including the rearrangement of parts, while within the scope of the present invention.

The embodiments of the invention in which an exclusive property or privilege is claimed are defined as follows:

1. An apparatus comprising: a control circuit which carries out an operational sequence, which has a request input and which totally ignores signals present at said request input prior to a predetermined point in said operational sequence and responds to signals present at said request input after said predetermined point; a pair of connectors which each have a request terminal and can each removably receive a circuit card; and means electrically coupling said connectors to said control circuit, including said request terminal of each said connector being connected to said request input of said control circuit; wherein said control circuit includes checking means for detecting prior to said predetermined point in said sequence a condition in which said connectors each have therein a card having a request output line carrying a signal from a request circuit thereon and coupled to the request terminal of the connector, and includes inhibiting means responsive to detection of said condition for preventing said control circuit from reaching said predetermined point in said sequence.

2. An apparatus as recited in claim 1, wherein said control circuit has an acknowledge output which is connected to a further terminal of each of said connectors.

3. An apparatus as recited in claim 2, wherein said control circuit has a further request input and a further acknowledge output, and including a further pair of connectors which each have a request terminal and a further terminal, which can each removably receive a circuit card and which are each electrically coupled by said coupling means to said control circuit, including said request terminal and further terminal of each said further connector being respectively connected to said further request input and to said further acknowledge output of said control circuit, said checking means including means for detecting prior to said predetermined point in said sequence a further condition in which said connectors of said further pair each have therein a card having a request output line carrying a signal from a request circuit thereon and coupled to the request terminal of the connector, said inhibiting means being responsive to detection of said further condition for preventing said control circuit from reaching said predetermined point in said sequence.

4. An apparatus as recited in claim 1, wherein said coupling means includes a bus which facilitates said electrical coupling of said control circuit and said connectors, and wherein said control circuit includes bus control means for controlling said bus and means responsive to a signal at said request input for disabling said bus control means.

5. An apparats as recited in claim 4, wherein said bus is an EISA bus.

6. An apparatus as recited in claim 1, wherein said control circuit includes display means, and wherein said inhibiting means includes means responsive to detection of said condition for providing on said display means an operator perceptible message.

7. An apparatus as recited in claim 6, wherein said operator perceptible message includes instructions to terminate power to said apparatus, to thereafter shift a circuit card from one of said pair of connectors to a different connector, and to thereafter restore power to said apparatus.

8. An apparatus as recited in claim 1, wherein each circuit card having a request circuit controlling the request terminal thereon also includes an identification register, and wherein said control circuit includes means for carrying out for each said connector a read operation which will obtain the content of the identification register when a circuit card having an identification register is present in the connector, and means for evaluating the result of said read operation to determine whether the connector has therein a circuit card which has a request circuit controlling a request output line coupled to the request terminal of the connector.

9. An apparatus comprising: a control circuit having a request input; a pair of connectors which each have a request terminal and can each removably receive a circuit card; and means electrically coupling said connectors to said control circuit, including said request terminal of each said connector being connected to said request input of said control circuit; wherein said control circuit includes checking means for detecting a condition in which said connectors each have therein a card having a request output line carrying a signal from a request circuit thereon and coupled to the request terminal of the connector, wherein said control circuit is successively operable in first and second operational modes in which said control circuit respectively ignores totally and responds to signals present at said request input thereof, said control circuit actuating said checking means during said first operational mode, and wherein said checking means includes means responsive to detection of said condition during said first operational mode for preventing said control circuit from operating in said second operational mode.

10. An apparatus as recited in claim 6, wherein said control circuit includes means responsive to commencement of operation of said control circuit for automatically causing said control circuit to operate in said first operational mode and actuate said checking means.

11. An apparatus comprising: a control circuit which carries out an operational sequence, which has a request input and which totally ignores signals present at said request input prior to a predetermined point in said operational sequence and responds to signals present at said request input after said predetermined point; a pair of connectors which each have a request terminal and can each removably receive a circuit card; and means electrically coupling said connectors to said control circuit, including said request terminal of each said connector being connected to said request input of said control circuit; wherein said control circuit includes checking means operable prior to said predetermined point in said sequence for detecting a condition in which said connectors each have therein a card having a request output line carrying a signal from a request circuit thereon and coupled to the request terminal of the connector, and includes inhibiting means responsive to detection of said condition for preventing said control circuit from reaching said predetermined point in said sequence, wherein said control circuit has a further request input, and including a further pair of connectors which each have a request terminal, which can each removably receive a circuit card and which are each electrically coupled by said coupling means to said control circuit, including said request terminal of each said further connector being connected to said further request input of said control circuit, said checking means including means for detecting prior to said predetermined point in said sequence a further condition in which said connectors of said further pair each have therein a card having a request output line carrying a signal from a request circuit thereon and coupled to the request terminal of the connector, said inhibiting means being responsive to detection of said further condition for preventing said control circuit from reaching said predetermined point in said sequence.

12. A method of controlling a system which includes a control circuit having a request input and operable successively in first and second modes in which said control circuit respectively ignores totally and is responsive to signals present at said request input, and includes a pair of connectors which each have a request terminal connected to said request input and can each removably receive a circuit card, comprising the steps of: causing said control circuit to operate in said first mode, checking for a condition during said first mode in which said connectors each have therein a circuit card having a request output line carrying a signal from a request circuit thereon and coupled to the request terminal of the connector, and thereafter responding to the presence of said condition by preventing operation of said control circuit in said second mode.

13. A method as recited in claim 12, including the steps of simultaneously applying to a further request input of said control circuit an electrical state at a request terminal of each of two connectors of a further pair of connectors, said checking step including the step of detecting a condition in which said connectors of said further pair each have therein a circuit card having a request output line carrying a signal from a request circuit thereon and coupled to the request terminal of the connector, and said responding step including the steps of preventing operation of said control circuit in said second mode in response to the presence of said further condition.

* * * * *